A. REBORI.
AUTOMATIC SWITCH FOR POINT BLADES.
APPLICATION FILED DEC. 12, 1921.
1,412,136.
Patented Apr. 11, 1922.
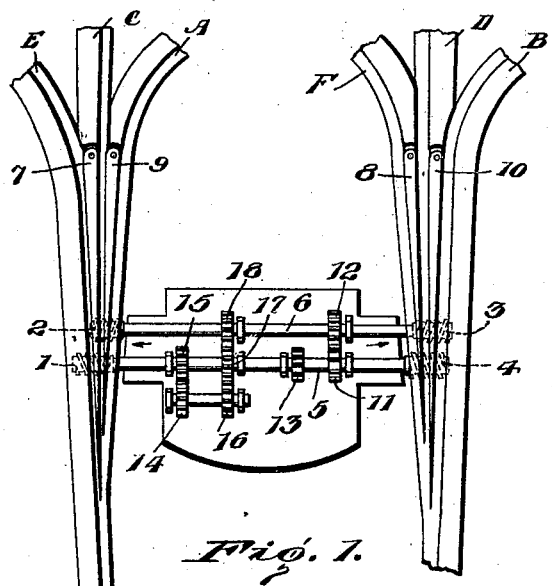
Fig. 1.
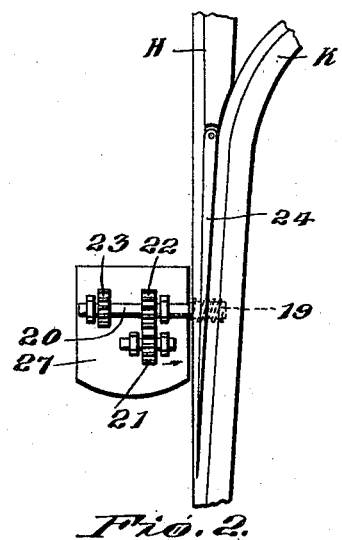
Fig. 2.
Fig. 3.
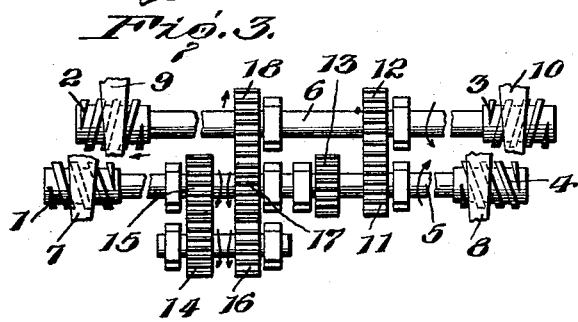
Fig. 4.
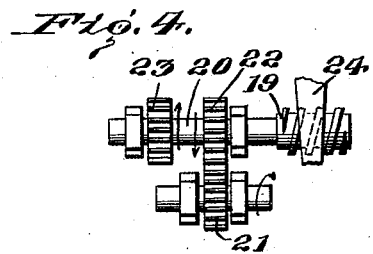
Fig. 5.
Fig. 6.
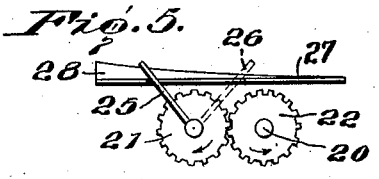
Fig. 7.
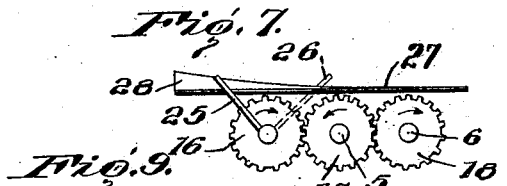
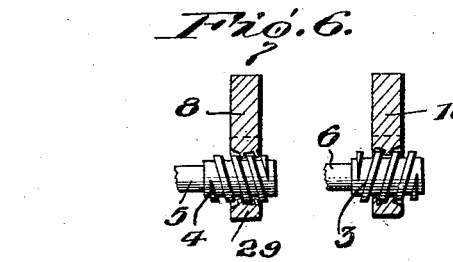
Fig. 9.
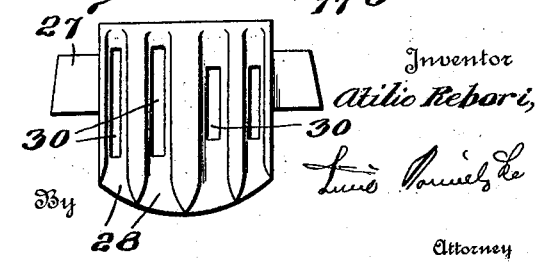
Fig. 8.
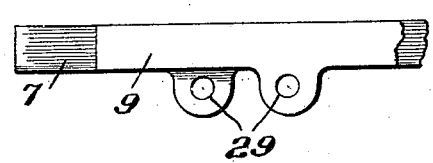
Inventor
Atilio Rebori,
By
Attorney

UNITED STATES PATENT OFFICE.

ATILIO REBORI, OF BUENOS AIRES, ARGENTINA.

AUTOMATIC SWITCH FOR POINT BLADES.

1,412,136. Specification of Letters Patent. Patented Apr. 11, 1922.

Application filed December 12, 1921. Serial No. 521,903.

*To all whom it may concern:*

Be it known that I, ATILIO REBORI, subject of the King of Italy, residing at 2272 Paseo Leandro N. Alem, Buenos Aires, Republic of Argentina, have invented certain new and useful Improvements in Automatic Switches for Point Blades, of which the following is a specification.

This invention relates to automatic switch points for railways and the like, its object being to provide a novel device which may be acted upon by the passage of the vehicles irrespective of their speed.

The main feature of my present invention consists in the fact that the angular switching of the points is determined by a rotary and angular movement of a rod or rods which may screw or unscrew on the same and by a combination of a number of toothed wheels or toothed wheels and levers which may produce an angular reversal of movement resulting in a rotary and angular displacement of the rods and in consequence in an angular switching of the points.

According to my present invention at the points wherein the rods are located under the point blades or at any other suitable points the rods carry or are formed integral with screw threaded portions which are capable of screwing or unscrewing in similarly screw-threaded parts of the point blade.

In order that the rotary and angular movement of the said rods may produce an angular as acute as possible and that the points may be moved from right to left or from left to right with a maximum lateral displacement, the threads should be of the type known as worm screws and generally there should be at least four of them so that with a quarter rotation of the rod the point blades will be displaced a distance equal to the pitch of one screw thread.

The main object in providing as many screw threads as possible is to facilitate a full movement of the point blade with a maximum rotary and angular displacement of the rods and in order that the point blade be firmly pushed and returned against the sides of the rails with a maximum pressure.

In a single switch point the rod or axle need not run across the track, it being sufficient that said rod be of a length to enable the fixing of the screw threaded part and of the toothed wheels and levers required for the maneuvre.

If a toothed wheel be fixed to the axle, and said toothed wheel meshes with and is driven by a second toothed wheel, the latter turning clockwise, the first toothed wheel together with the axle will turn counterclockwise. Should the axle also carry a fixed lever, when turning counterclockwise, said lever will fall to the left and the blade will be carried, for instance from right to left. If the lever is carried to the right, the point blade will also be carried to the right and the second toothed wheel will be returned to its original position.

It is obvious that the displacement of the point blade is due to the fact that the rotary motion of the axle in one direction screws, and in the other direction unscrews, upon the blade; and since the said axle is incapable of lengthwise displacement, the point blade will be forced to lateral displacement in one direction or the other accordingly.

The double of four point switch is based on the same principle. According to circumstances in double switches a set of four toothed wheels and two or four levers, or two sets of three toothed wheels with four levers or without any lever, or of five or more toothed wheels with or without levers may be used.

The screw threads may be all clockwise or all counterclockwise, or one clockwise and the other counterclockwise or vice versa, and for each combination of toothed wheels which may be required for the lateral movements of each pair of point blades.

The toothed wheels or levers may be placed between both rails or at the sides of the track as desired. The locomotive or first vehicle of the train, or the vehicle or car itself in case there is one vehicle only, should be provided with suitable racks or levers so as to act upon the toothed wheel or levers of the axle in order to switch the points before the wheels of the vehicle reach them.

Some of the many advantages which may be obtained with my improved switch are as follows:

1st. Due to the fact that the switching of the points is produced by the angular turning of an axle fixed in a lateral direction, which axle cannot follow the movement of the blade said blades will not be displaced during the passage of the train, tramway etc.

2nd. In the best known switches the rod and the point blade run simultaneously for the same distance and in the same direction, this being the main cause of most of the derailments at the points. According to my present invention an absolute immobilization of the points is obtained, the point blades being firmly held against the side of the rails by a single movement and by the same vehicle.

3rd. In ordinary tramcar switches the usual bevelled part for the introduction of the operating lever may be omitted.

4th. Due to the quick and energetic action of the device any stone-like material which may have been introduced between blade and rail is easily pulverized.

5th. At night or when the track is flooded, the driver need not "feel" for the points and he may simply advance, setting the right levers in position, fully assured that he will set the right point or follow it if it was already switched on.

In order that my present invention may be clearly understood and easily carried into practice I have shown two embodiments of the same in the appended drawings wherein.

Fig. 1 is a plan view of the improved invention as used with a double switch.

Fig. 2 is a like view as applied to a single switch.

Fig. 3 shows diagrammatically the disposition of the axle and toothed wheels of a double switch.

Fig. 4 shows similarly the same appliance as used with the single switch of Fig. 2.

Fig. 5 is a diagram showing the toothed wheel and levers for a single switch.

Fig. 6 shows the manner in which the screw threaded portions of the axles are placed in respect of the point blades.

Fig. 7 is a view similar to Fig. 5, but as applied to a double switch according to Figures 1 and 3.

Fig. 8 is a side view of the position of the point blades in a double switch and finally, Figure 9 is a plan view of the plate shown in Figure 7 illustrating the position of the several slots and guideways for the operating levers.

Like characters of reference denote the same or like parts throughout the said drawings.

Referring now to the embodiments represented, Figure 1 shows a double switch, in which the screw threaded portions of the axles 5 and 6 are indicated at 1, 2, 3, and 4. AB is a right side track, CD is the central or main track and EF is the left side track. The point blades are indicated at 7, 8, 9, and 10. The movement of the blades is produced as follows: In the said figure the point blades are switched on for the right-hand siding AB. In order to switch them on for the main track CD, the free gear 11 on axle 5 is rotated backwards, said wheel meshing with a gear 12 fixed to the axle 6 which corresponds to the point blades 9 and 10. In consequence, these later will move to the right (in the position of the drawings). Should the points be switched on to the left-hand siding EF the toothed wheel 13 is actuated, said wheel being fixed to the axle 5 which corresponds to the point blades 7 and 8 and these later will move towards the right, against the point blades 9 and 10. Now in order to switch on the points to the main track CD the free rotating toothed wheel 16 is acted upon, this latter meshing with the free toothed wheel 17 on axle 5 and this in turn with the toothed wheel 18 fixed to the axle 6 corresponding to the point blades 9 and 10. Such reverse movements of the point blades is due to the fact that the blades 7—8 (axle 5) have their screws 1 and 4 rightwards and the blades 9 and 10 (axle 6) have their screws (2 and 3) leftwards and that they are acted upon by a number of toothed wheels as shown in the drawings.

The screw threads might be all to the right or all to the left but in such case the number of toothed wheels as shown in the drawings would have to be changed. The arrows at the side of each of the toothed wheels show the direction of their rotation when turned forward and the arrows parallel to the axles 5 and 6 show the direction of movement of the point blades when acted upon in the direction of such first named arrows.

When the set of gear wheels 13 and 11—12 is turning to the direction of the arrows, the toothed wheels 14—15 and 16—17—18 are turning in a direction opposite to that shown by the said arrows and when these later are turning in the direction of their respective arrows, the first named, that is 13, 11—12 will turn in a direction opposite to that shown by their respective arrows. Should the switching be double, that is, when the four point blades are to be moved together it is sufficient to simultaneously move the gear wheels 11—13 or 14—16, as will be clearly understood from the drawings and from the above description.

It will be also easily understood that during, and on completion of, a switching operation, the automatic switch will be ready to be acted upon by another vehicle or train to be switched on another track.

When the gear wheel 13 is turned to move the point blades to the right for instance, the gear wheel 14 will be turned in an opposite direction and in consequence this latter will be ready to be acted upon to move to point blades to the left.

Figure 2 shows a single switch. H is the main track and K the side track to the right. The same principle as used in Figure 1 is applied to the present embodiment. On turning the free gear wheel 21, the gear wheel 22 fixed to the axle 20 is also turned and this later by means of the leftwards screwthreaded portion 19 moves the point blade 24 to the right. On acting now directly on the gear wheel 23 fixed on the same axle 20, the point blade will be pressed to the left and the free gear wheel 21 will return to its original position.

Figures 3 and 4 show more clearly the gearing of Figures 1 and 2 respectively. Figure 5 shows the working of the switch in Figures 2 and 4 and Figure 7 shows the working of the switch of Figures 1 and 3, but as acted upon by means of lever arm. Figure 5 shows gear wheels 21 and 22, and axle 20 above mentioned, and also shows a metal plate 27 provided with a guideway 28 for the operating lever fixed to the body of the vehicle, in order to engage the lever arm 25 fixed to the axle of the gear 21, this latter meshing with the gear wheel 22. On completing the movement, (and on completing the movement of the point blades) the lever arm 25 is carried to 26. Figure 7 represents the corresponding parts for the double switch of Figures 1 and 3; and Figure 6 shows the right-hand threaded portions 3 and 4 of the axles 6 and 5, and also shows the threaded openings 29 in the blades 8 and 10.

Figure 8 shows two point blades, a long one 7 and a short one 9, together with their openings 29. Figure 9 shows a metal plate 27 as used in the embodiment of Figure 1, said plate being provided with guideways 28 and slots 30 for the passage of the lever arms 25 or of the gear wheels 4, 16, 13 and 11.

I declare that what I claim is:—

1. An automatic switch for the point blades of rail tramways and the like comprising an axle rotatably mounted but incapable of lengthwise movement, said axle being provided with a screwthreaded portion capable of screwing and unscrewing in correspondingly screwthreaded orifices in the body of the point blade, and sets of gear wheels capable of being turned by the passage of the vehicle so as to rotate said axle in either direction, substantially as hereindescribed and for the purposes set forth.

2. An automatic switch for the point blades of rail tramways and the like comprising a number of axles corresponding to the number of pairs of point blades in the switch, each of the said axles being mounted to rotate but incapable of lengthwise movement and carrying screwthreaded portions capable of screwing and unscrewing in the corresponding point blades according to their direction of rotation, and means for turning said axles in either direction, substantially as hereinbefore described and for the purposes set forth.

3. An automatic switch for the point blades of rail tramways and the like comprising a number of axles corresponding to the number of pairs of point blades in the switch, each being provided with screwthreaded portions capable of screwing and unscrewing in the corresponding point blades, said axles being mounted to rotate but incapable of lengthwise movement, gear wheels mounted on the said axles, and lever arms for turning the said gear wheels, substantially as herein described and for the purposes set forth.

In testimony whereof I affix my signature.

ATILIO REBORI.